(12) United States Patent
Kats et al.

(10) Patent No.: US 11,102,175 B1
(45) Date of Patent: Aug. 24, 2021

(54) SYSTEMS AND METHODS FOR CATEGORIZING WEB APPLICATIONS BASED ON AGE RESTRICTIONS IN ONLINE CONTENT POLICIES

(71) Applicant: Symantec Corporation, Mountain View, CA (US)

(72) Inventors: Daniel Kats, Culver City, CA (US); Trijimon Padmalayam Rajan, Tamil Nadu (IN); Manjunath Rajendrababu, Tamil Nadu (IN)

(73) Assignee: NortonLifeLock Inc., Tempe, AZ (US)

( * ) Notice: Subject to any disclaimer, the term of this patent is extended or adjusted under 35 U.S.C. 154(b) by 81 days.

(21) Appl. No.: 16/562,380

(22) Filed: Sep. 5, 2019

(51) Int. Cl.
| *H04L 29/06* | (2006.01) |
| *G06F 16/9535* | (2019.01) |
| *H04L 29/08* | (2006.01) |
| *G06F 16/906* | (2019.01) |

(52) U.S. Cl.
CPC ........ *H04L 63/0245* (2013.01); *G06F 16/906* (2019.01); *G06F 16/9535* (2019.01); *H04L 63/101* (2013.01); *H04L 63/104* (2013.01); *H04L 67/22* (2013.01)

(58) Field of Classification Search
CPC . H04L 63/0245; H04L 63/101; H04L 63/104; H04L 67/22; G06F 16/906; G06F 16/9535
USPC .......................................................... 709/224
See application file for complete search history.

(56) References Cited

U.S. PATENT DOCUMENTS

| 8,434,126 | B1 * | 4/2013 | Schepis | H04N 21/44222 |
| | | | | 726/1 |
| 9,485,206 | B2 * | 11/2016 | Day, II | H04W 4/029 |
| 2003/0065571 | A1 * | 4/2003 | Dutta | G06Q 30/0607 |
| | | | | 705/26.25 |
| 2013/0291004 | A1 * | 10/2013 | Yuan | H04L 63/101 |
| | | | | 725/28 |
| 2015/0095985 | A1 * | 4/2015 | Hua | H04L 63/10 |
| | | | | 726/4 |
| 2018/0332347 | A1 * | 11/2018 | Hamiti | H04N 21/435 |
| 2020/0250557 | A1 * | 8/2020 | Kishimoto | G06N 5/045 |

FOREIGN PATENT DOCUMENTS

EP      2293215 A2 * 3/2011 ........... H04L 65/602

OTHER PUBLICATIONS

Symantec, "Symantec Corporation, Symantec RuleSpace™ Data Sheet—OEM URL Categorization Database and Real-time Web Categorization Technology", URL: https://www.symantec.com/content/dam/symantec/docs/data-sheets/rulespace-en.pdf, Sep. 2015, pp. 1-6.

* cited by examiner

*Primary Examiner* — Michael C Lai
(74) *Attorney, Agent, or Firm* — FisherBroyles, LLP

(57) ABSTRACT

The disclosed computer-implemented method for categorizing web applications based on age restrictions in online content policies may include (i) accessing a web application associated with a group of application pages, (ii) determining policy data for accessing content from the web application in the application pages, (iii) extracting one or more age restrictions for accessing the web application from the policy data, and (iv) performing a security action that prevents underage access to the web application based on the age restrictions. Various other methods, systems, and computer-readable media are also disclosed.

17 Claims, 7 Drawing Sheets

SYSTEMS AND METHODS FOR CATEGORIZING WEB APPLICATIONS BASED ON AGE RESTRICTIONS IN ONLINE CONTENT POLICIES

BACKGROUND

Parental control systems are often utilized by computing devices to restrict access to one or more categories of online content considered to be inappropriate for viewing by underage users. For example, parental control systems may categorize websites into pre-defined groups such as "social networking," "shopping," and "gaming". Based on the categories, a parent or other responsible party may then decide which categories are appropriate for viewing by a user and/or one a computing device within their scope of control.

Conventional parental control systems may often present default options of acceptable categories for a variety of suggested age ranges which may further be altered to fit a user's parenting style. However, these suggested (or altered) age ranges corresponding to acceptable categories for viewing online content may often be incongruous with intended age ranges determined by content providers for viewing the online content on websites and/or within mobile device applications.

SUMMARY

As will be described in greater detail below, the present disclosure describes various systems and methods for categorizing web applications based on age restrictions in online content policies.

In one example, a method for categorizing web applications based on age restrictions in online content policies may include (i) accessing a web application associated with a group of application pages, (ii) determining policy data for accessing content from the web application in the application pages, (iii) extracting one or more age restrictions for accessing the web application from the policy data, and (iv) performing a security action that prevents underage access to the web application based on the age restrictions.

In some embodiments, the security action may include updating a parental control filter with the age restrictions to prevent access to one or more services provided by the web application.

In some examples, the policy data for the web application may be determined by (i) parsing a source application page for an address to a target application page containing the policy data and (ii) utilizing the address to load the target application page containing the policy data in a browser. In some embodiments, the age restrictions for accessing the web application may be extracted from the policy data by (i) analyzing, utilizing one or more heuristics and natural language processing, the policy data to identify text describing the one or more age restrictions and (ii) retrieving the text describing the one or more age restrictions from the policy data.

In some embodiments, the policy data may include a web application terms document, a web application terms of use document, or a web application privacy policy document. Additionally or alternatively, the policy data may include different age restrictions based on a geographic location of a user accessing the web application. In some examples, the age restrictions may include a minimum age for accessing at least one service provided by the web application. In some embodiments, the web application may be a website for accessing the application pages over a network. In other embodiments, the web application may be a mobile device application for accessing the application pages over a network.

In one embodiment, a system for categorizing web applications based on age restrictions in online content policies may include at least one physical processor and physical memory that includes a set of modules and computer-executable instructions that, when executed by the physical processor, cause the physical processor to (i) access, by an access module, a web application associated with a group of application pages, (ii) determine, by a determining module, policy data for accessing content from the web application in the application pages, (iii) extract, by an extraction module, one or more age restrictions for accessing the web application from the policy data, and (iv) perform, by a security module, a security action that prevents underage access to the web application based on the age restrictions.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) access a web application associated with a group of application pages, (ii) determine policy data for accessing content from the web application in the application pages, (iii) extract one or more age restrictions for accessing the web application from the policy data, and (iv) perform a security action that prevents underage access to the web application based on the age restrictions.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
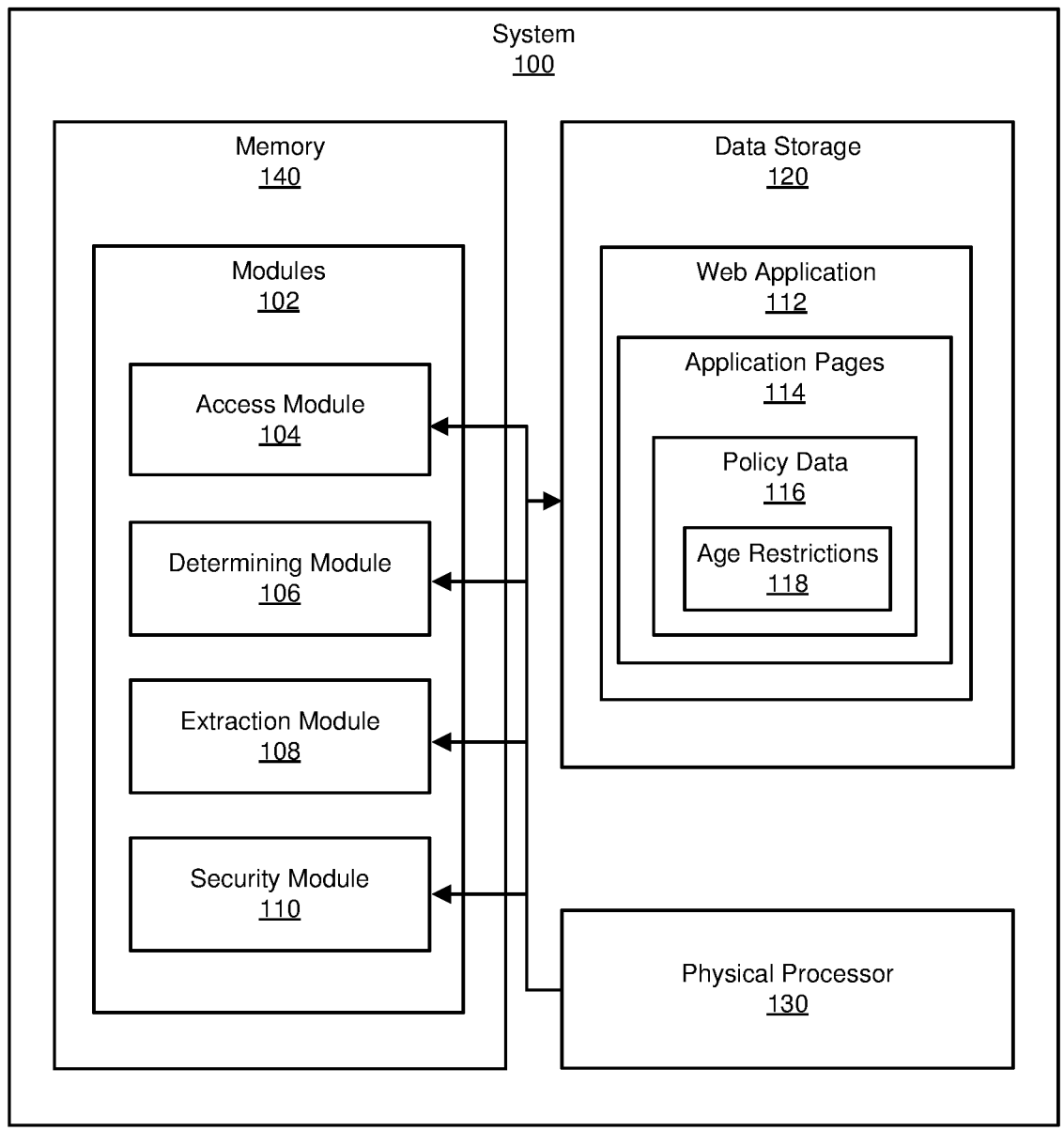
FIG. 1 is a block diagram of an example system for categorizing web applications based on age restrictions in online content policies.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for categorizing web applications based on age restrictions in online content policies. As will be described in greater detail below, the systems and methods described herein may extract age restrictions (which may be further distinguished based on a user's geographic location or region) for viewing online content directly from policy documents provided by a web service. By extracting age restrictions in this way, the systems and methods described herein may identify appropriate age limits for viewing online content on websites and/or within mobile device applications without relying on pre-defined or arbitrarily-defined age ranges for viewing certain content categories provided by conventional parental control systems.

In addition, the systems and methods described herein may improve computing device security by increasing the effectiveness of parental control filters for preventing unintended access to prohibited online content through the extraction of appropriate age restrictions defined in a web service's online content policies.

Figure 2:
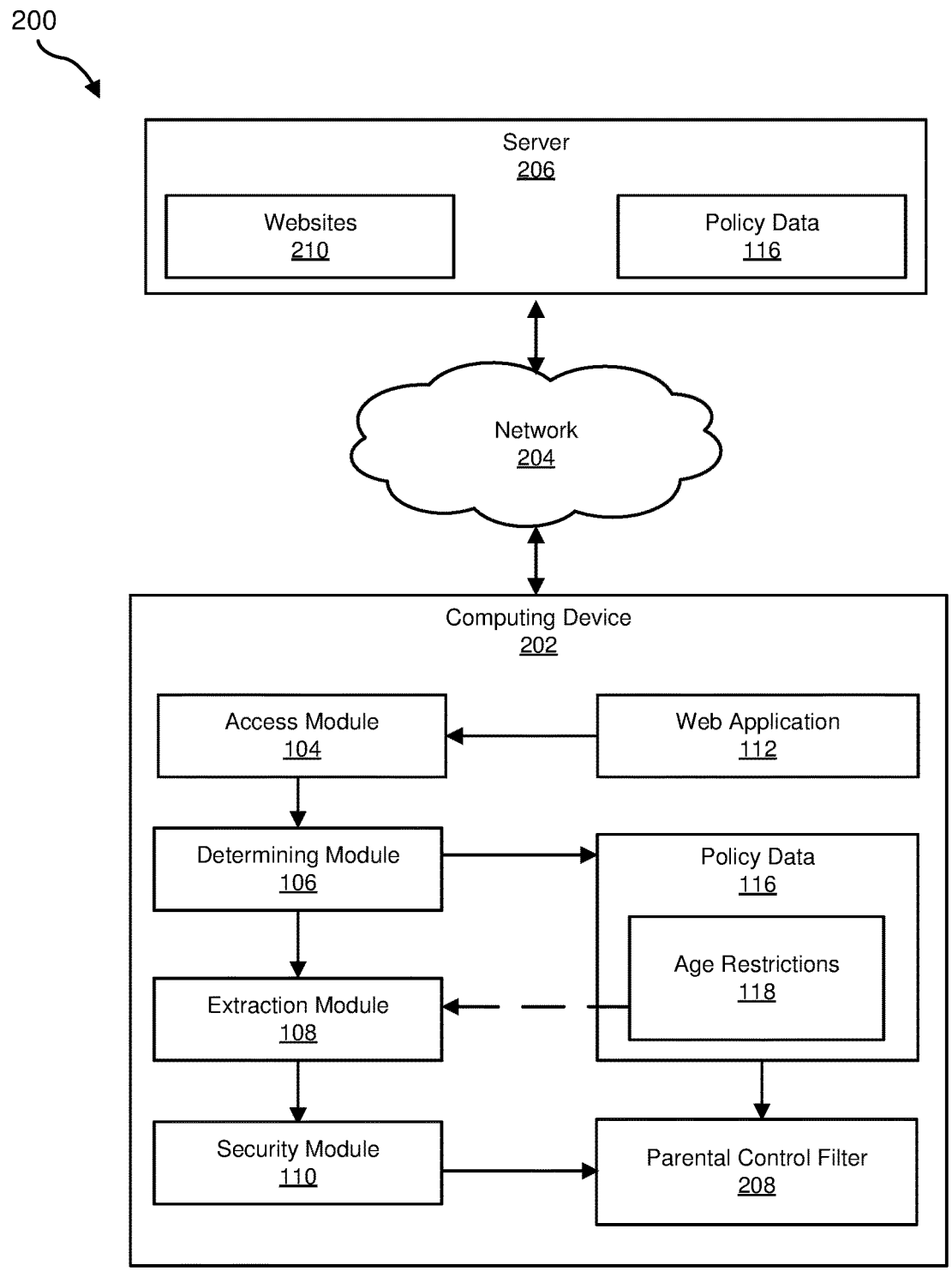
FIG. 2 is a block diagram of an additional example system for categorizing web applications based on age restrictions in online content policies.

The following will provide, with reference to FIGS. 1-2, detailed descriptions of example systems for categorizing web applications based on age restrictions in online content policies. Detailed descriptions of corresponding computer-implemented methods will also be provided in connection with FIG. 3. Detailed descriptions of an example website page and example user interfaces generated by an example system for categorizing web applications based on age restrictions in online content policies will also be provided in connection with FIGS. 4 and 5, respectively. In addition, detailed descriptions of an example computing system and network architecture capable of implementing one or more of the embodiments described herein will be provided in connection with FIGS. 6 and 7, respectively.

FIG. 1 is a block diagram of an example system 100 for categorizing web applications based on age restrictions in online content policies. As illustrated in this figure, example system 100 may include one or more modules 102 for performing one or more tasks. For example, and as will be explained in greater detail below, example system 100 may include a access module 104 that accesses a web application 112 associated with application pages 114. Example system 100 may additionally include a determining module 106 that determines policy data 116 for accessing content from the web application 112 in application pages 114. Example system 100 may also include an extraction module 108 that extracts one or more age restrictions 118 for accessing web application 112 from policy data 116. Example system 100 may additionally include a security module 110 that prevents underage access to web application 112 based on age restrictions 118. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate categorizing web applications based on age restrictions in online content policies. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store web application 112, application pages 114, policy data 116, and age restrictions 118.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to categorize web applications based on age restrictions in online content policies.

For example, access module 104 may access web application 112 (e.g., by accessing a website 210 from server 206 or a mobile device application) associated with a group of application pages. Next, determining module 106 may determine policy data 116 for accessing content from web application 112 in the application pages. Then, extraction module 108 may extract age restrictions 118 for accessing web application 112 from policy data 116. Finally, security module 110 may perform provide age restrictions 118 to a parental control filter 208 for preventing underage access to web application 112.

Computing device 202 generally represents any type or form of computing device capable of reading computer-executable instructions. In some examples, computing device 202 may be an endpoint device running client-side parental control system software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading and/or executing computer-readable instructions. In some examples, server 206 may be a web server that stores websites, web-based applications (e.g., mobile device applications), and policy data defining terms, terms of use, and/or privacy policies associated with user access to the websites and/or the web-based applications. Additional examples of server 206 include, without limitation, security servers, application servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
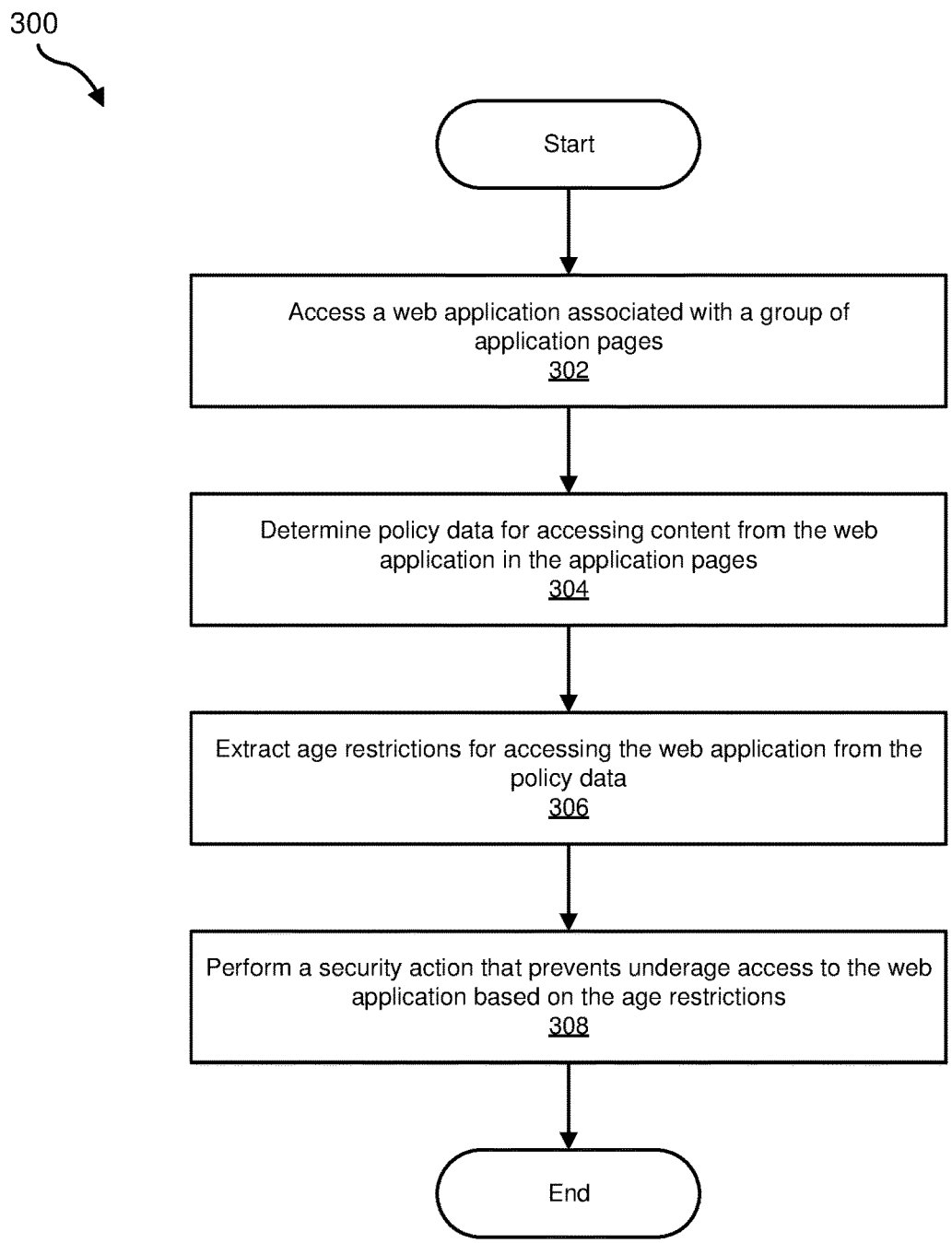
FIG. 3 is a flow diagram of an example method for categorizing web applications based on age restrictions in online content policies.

FIG. 3 is a flow diagram of an example computer-implemented method 300 for categorizing web applications based on age restrictions in online content policies. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may access a web application associated with a group of application pages. For example, access module 104 may, as part of computing device 202 in FIG. 2, access application 112 associated with application pages 114.

The term "web application," as used herein, generally refers to any website or mobile device application that may provide content in the form of one or more services to users over a network (e.g., the Internet). For example, services provided by a web application may include, without limitation, social networking services, electronic commerce (e.g., shopping) services, messaging services, gaming services, audio and/or video streaming services, etc. In some examples, a web application may include one or more application pages (e.g., web pages or mobile device application pages) for accessing provided services and also contain policies for accessing provided services.

At step 304, one or more of the systems described herein may determine policy data for accessing content from the web application in the application pages. For example, determining module 106 may, as part of computing device 202 in FIG. 2, determine policy data 116 for accessing content from web application 112 in application pages 114.

The term "policy data," as used herein, generally refers to any documents maintained by a web application provider outlining rules and restrictions associated with any services provided in association with using a web application. Example policy data may include, without limitation, terms documents, terms of use documents, and/or privacy policy documents. Each of the aforementioned documents may further specify restrictions associated with accessing web application services such as age-restrictions. In addition, in some embodiments, a web application provider may maintain different sets of policy documents associated with the use of a single service utilized in multiple geographic locations or regions due to conform with various legal requirements. Thus, a web application provider may maintain one set of policy documents for a service offered in the United States and a second set of policy documents (e.g., to conform to the General Data Protection Regulation (GPDR)) for the same service offered in member states of the European Union.

Determining module 106 may determine policy data 116 in a variety of ways. In some embodiments, determining module 106 may parse a source application page in application pages 114 for an address to a target application page in application pages 114 containing policy data 116. Determining module 106 may then utilize the address to load the target application page containing policy data 116 in a browser. For example, in one embodiment, determining module 106 may be configured to discover policy data 116 by utilizing web crawling to parse a home application page in web application 112 for a web address (e.g., a uniform resource locator (URL)) pointing to policy documents for services provided by web application 112. As another example, determining module 106 may be configured to discover the main pages of websites looking for links to pages entitled "Privacy Policy," "Terms," and "Terms of Use".

At step 306, one or more of the systems described herein may extract age restrictions for accessing the web application from the policy data determined at step 304. For example, extraction module 108 may, as part of computing device 202 in FIG. 2, extract age restrictions 118 for utilizing services provided by web application 112, from policy data 116.

Extraction module 108 may extract age restrictions 118 from policy data 116 in a variety of ways. In some embodiments, extraction module 108 may analyze policy data 116 utilizing heuristics and natural language processing to identify text describing age restrictions 118. Extraction module 108 may then retrieve the text describing age restrictions 118 from policy data 116. In some examples, age restrictions 118 extracted from policy data 116 may include a minimum age requirement for accessing at least one service provided by web application 112. Additionally or alternatively, age restrictions 118 extracted from policy data 116 may include multiple minimum age requirements for based on a geographic location from which the web application 112 is accessed. For example, policy data 116 extracted from a web application 112 utilized in the United States may mandate a minimum age requirement of 13 years while the same web application 112 utilized in the European Union may mandate a minimum age requirement of 16 years due to different laws in the aforementioned respective countries/regions.

At step 308, one or more of the systems described herein may perform a security action that prevents underage access to the web application based on the age restrictions retrieved at step 306. For example, security module 108 may, as part of computing device 202 in FIG. 2, perform a security action that prevents underage access to web application 112 based on age restrictions 118.

Security module 110 may perform a security action that prevents underage access to web application 112 based on age restrictions 118 in a variety of ways. In some embodiments, security module 110 may update parental control filter 208 with age restrictions 118 to prevent underage access to one or more services provided by web application 112. In this example, a parental control application may utilize the updated parental control filter 208 to determine a minimum legal age requirement (obtained from age restrictions 118) for using web applications corresponding to one or more provided filtering categories (e.g., social networking). Thus, in this way, the functionality of the parental control application may be enhanced to prevent age-based access based solely on web application categories, thereby preventing an underage user from accessing certain web applications that he or she may not legally be allowed to use due to these web applications having different minimum age requirements than other web applications in a particular category. Additionally or alternatively, the functionality of the parental control application may be enhanced to prevent age-based access based solely on a single locality, thereby preventing an underage user from accessing certain web applications that he or she may not legally be allowed to use in certain countries/regions due to these web applications having different minimum age requirements based on a geographic location from which a web application is accessed.

Figure 4:
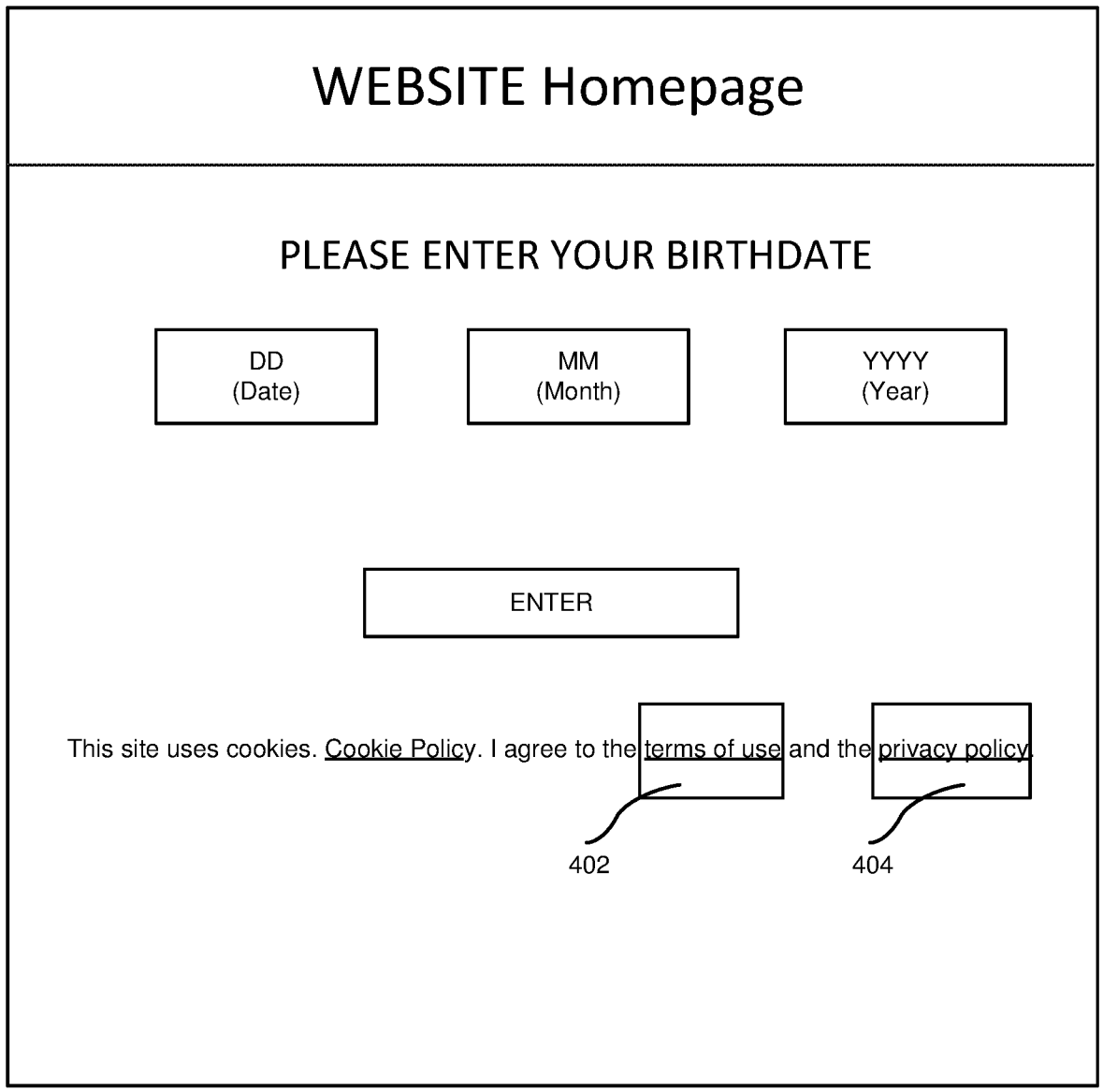
FIG. 4 Is a block diagram of an example website page generated by an example system for categorizing web applications based on age restrictions in online content policies.

FIG. 4 Is a block diagram of an example website page 400 generated by an example system for categorizing web applications based on age restrictions in online content policies. In some embodiments, the example website page 400 may be a home page for a website that provides a service for adult users and that further requests a user's birthdate information for accessing further portions (e.g., web pages) on the website. In some examples, the requested birthdate information is not verified and thus the website may potentially provide access to underage users.

Website page 400 also includes a "terms of use" link 402 and a "privacy policy" link 404 for accessing policy data for use of services provided by the website. As discussed above with respect to FIG. 3, determining module 106 may be configured to discover links 402 and 404 as they are likely to contain age restrictions 118 for the website. Furthermore, extraction module 108 may be configured to access and analyze the linked web pages containing the "terms of use" and "privacy policy" and any extract age restrictions 118 discovered for utilizing the services provided by the website.

Figure 5:
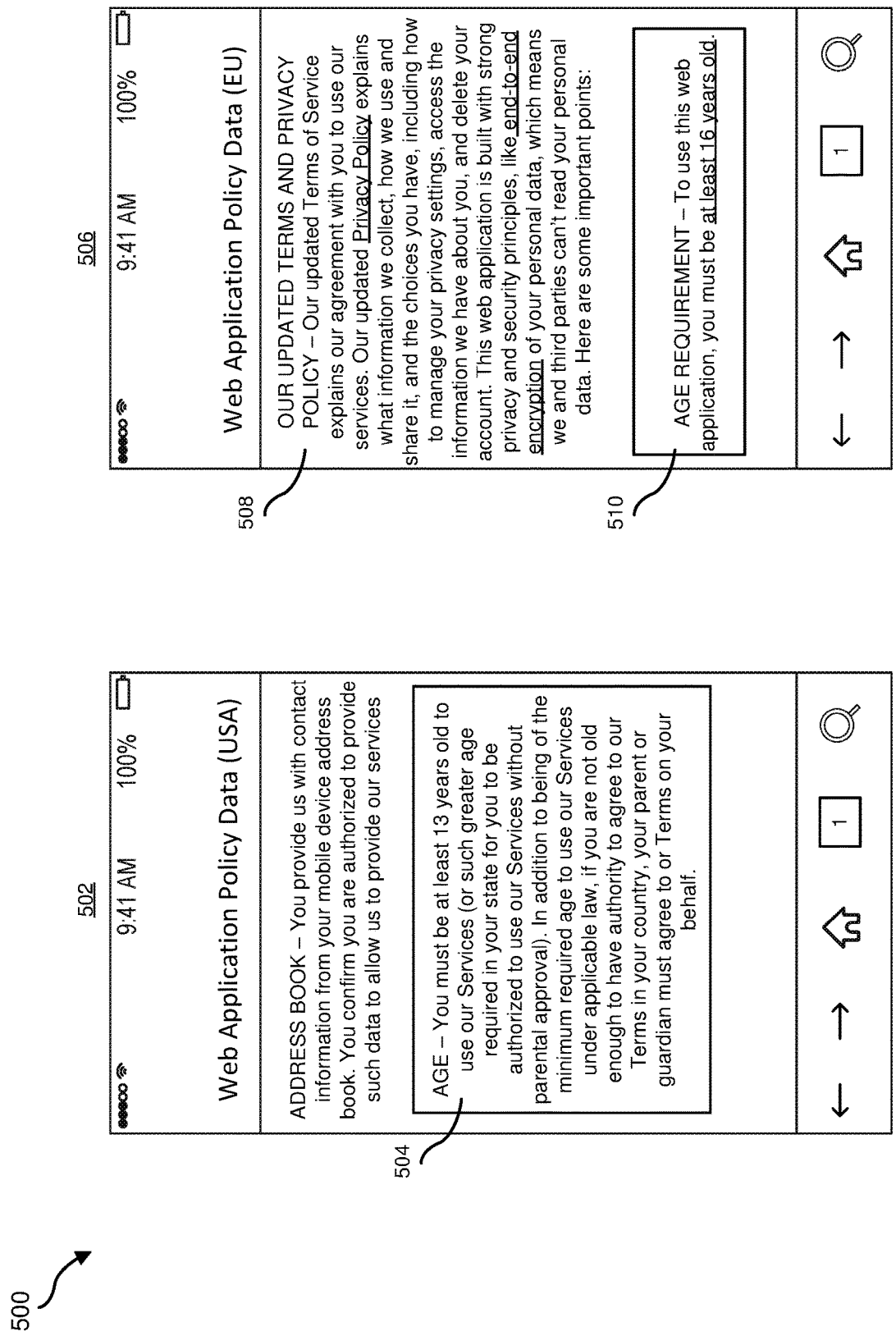
FIG. 5 is a block diagram of an example user interfaces generated by an example system for categorizing web applications based on age restrictions in online content policies.

FIG. 5 Is a block diagram of example user interfaces 500 generated by an example system for categorizing web applications based on age restrictions in online content policies. In some embodiments, the example user interfaces 500 may include user interfaces 502 and 506 containing policy data for using a web application in both the United States (USA) and the European Union (EU), respectively.

In some embodiments, policy data for the web application in user interface 502 may include an age section 504 including a minimum age requirement for accessing services provided in the USA. As discussed above with respect to FIG. 3, extraction module 108 may be configured to access and analyze the policy data to extract the minimum age requirement (e.g., by utilizing a combination of natural language processing and heuristics) for updating parental control filter 208 with respect to the use of the web application in the USA.

In some embodiments, policy data for the web application in user interface 506 may include a "terms and privacy" policy 508 which further includes an "age requirement" section 510 including a minimum age requirement for accessing services provided in the EU. As discussed above with respect to FIG. 3, extraction module 108 may be configured to access and analyze the policy data to extract the minimum age requirement (e.g., by utilizing a combination of natural language processing and heuristics) for updating parental control filter 208 with respect to the user of the web application in the EU.

As explained in connection with method 300 above, the systems and methods described herein provide for extracting age restrictions for web applications (e.g., websites and mobile device applications) directly from policy documents provided by corresponding services. By providing the submitted age restrictions (in either an online or offline mode) to a parental control categorization system, the systems described herein may enhance purely category-based web filtering by using the minimum age requirement for specific web applications and further using the minimum age requirement based on the country from which the web applications are accessed. Thus, the systems disclosed herein may prevent underage access to web applications that may be allowed by conventional parental control categorization systems configured to use the same minimum age requirement for all web applications in a particular category (e.g., social networking) without regard to the fact that some of the web applications in the category may have different minimum age requirements and/or may have different minimum age requirements based on a geographical location from which the websites are accessed.

Figure 6:
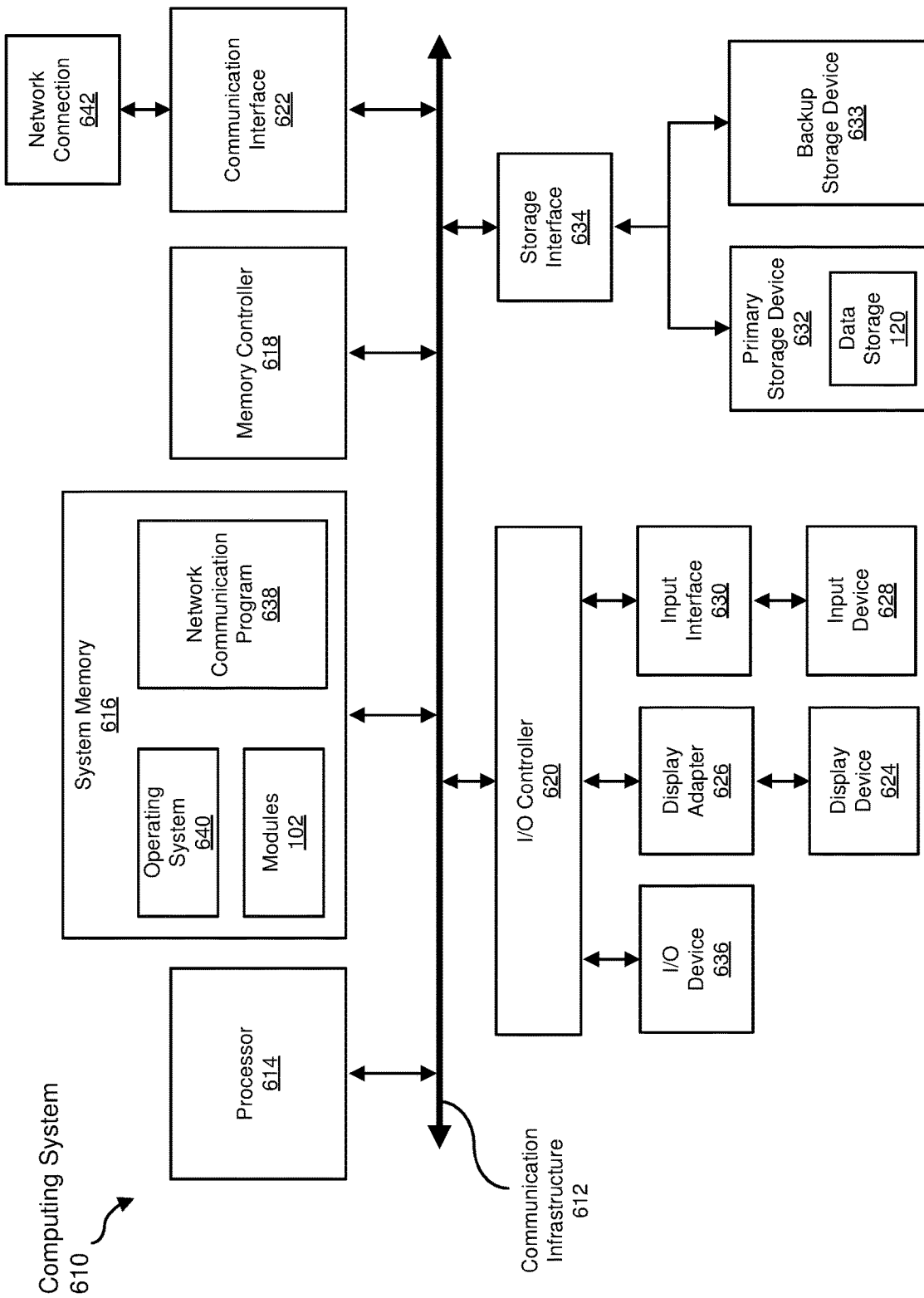
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
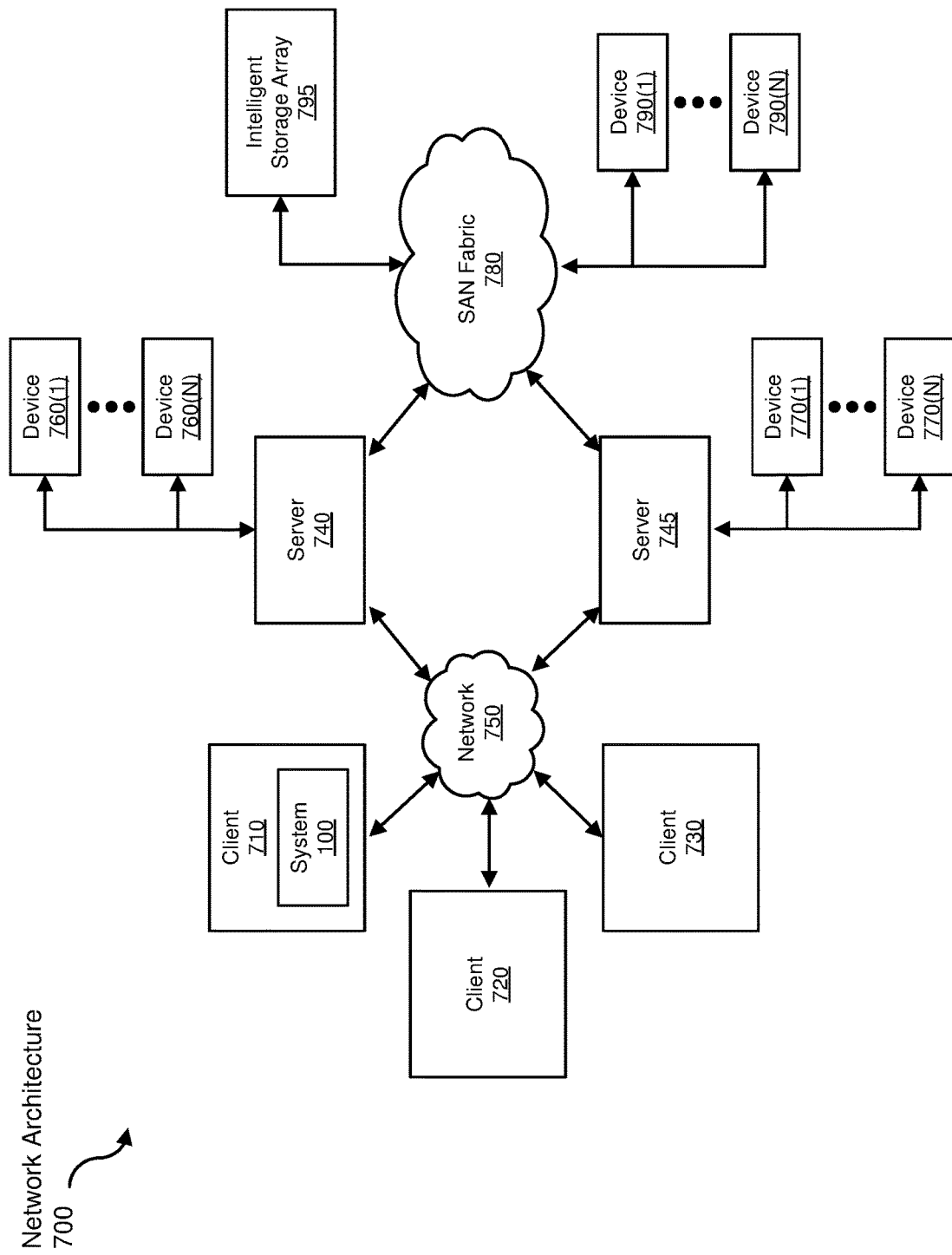
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N)

and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for categorizing web applications based on age restrictions in online content policies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for categorizing web applications based on age restrictions in online content policies, at least a portion of the method being performed by one or more computing devices comprising at least one processor, the method comprising:
    accessing, by the one or more computing devices, a web application associated with a plurality of application pages;
    determining, by the one or more computing devices, policy data for accessing content from the web application in the application pages, wherein determining the policy data for the web application comprises:
        parsing a source application page for an address to a target application page comprising the policy data; and
        utilizing the address to load the target application page comprising the policy data in a browser;
    extracting, by the one or more computing devices, one or more age restrictions for accessing the web application from the policy data; and
    performing, by the one or more computing devices, a security action that prevents underage access to the web application based on the age restrictions.

2. The computer-implemented method of claim 1, wherein performing the security action comprises updating a parental control filter with the age restrictions to prevent access to one or more services provided by the web application.

3. The computer-implemented method of claim 1, wherein extracting the one or more age restrictions for accessing the web application from the policy data comprises:
    analyzing, utilizing one or more heuristics and natural language processing, the policy data to identify text describing the one or more age restrictions; and
    retrieving the text describing the one or more age restrictions from the policy data.

4. The computer-implemented method of claim 1, wherein the policy data comprises at least one of:
    a web application terms document;
    a web application terms of use document; or
    a web application privacy policy document.

5. The computer-implemented method of claim 1, wherein the policy data comprises different age restrictions based on a geographic location of a user accessing the web application.

6. The computer-implemented method of claim 1, wherein the one or more age restrictions comprises a minimum age for accessing at least one service provided by the web application.

7. The computer-implemented method of claim 1, wherein the web application comprises a website for accessing the application pages over a network.

8. The computer-implemented method of claim 1, wherein the web application comprises a mobile device application for accessing the application pages over a network.

9. A system for categorizing web applications based on age restrictions in online content policies, the system comprising:
    at least one physical processor;

physical memory comprising computer-executable instructions and one or more modules that, when executed by the physical processor, cause the physical processor to:
- access, by an access module, a web application associated with a plurality of application pages;
- determine, by a determining module, policy data for accessing content from the web application in the application pages, wherein the determining module determines the policy data for the web application by:
  - parsing a source application page for an address to a target application page comprising the policy data; and
  - utilizing the address to load the target application page comprising the policy data in a browser;
- extract, by an extraction module, one or more age restrictions for accessing the web application from the policy data; and
- perform, by a security module, a security action that prevents underage access to the web application based on the age restrictions.

10. The system of claim 9, wherein the security module performs the security action by updating a parental control filter with the age restrictions to prevent access to one or more services provided by the web application.

11. The system of claim 9, wherein the extraction module extracts the one or more age restrictions for accessing the web application from the policy data by:
- analyzing, utilizing one or more heuristics and natural language processing, the policy data to identify text describing the one or more age restrictions; and
- retrieving the text describing the one or more age restrictions from the policy data.

12. The system of claim 9, wherein the policy data comprises at least one of:
- a web application terms document;
- a web application terms of use document; or
- a web application privacy policy document.

13. The system of claim 9, wherein the policy data comprises different age restrictions based on a geographic location of a user accessing the web application.

14. The system of claim 9, wherein the one or more age restrictions comprises a minimum age for accessing at least one service provided by the web application.

15. The system of claim 9, wherein the web application comprises a website for accessing the application pages over a network.

16. A non-transitory computer-readable medium comprising one or more computer-executable instructions that, when executed by at least one processor of a computing device, cause the computing device to:
- access a web application associated with a plurality of application pages;
- determine policy data for accessing content from the web application in the application pages, wherein the policy data for the web application is determined by:
  - parsing a source application page for an address to a target application page comprising the policy data; and
  - utilizing the address to load the target application page comprising the policy data in a browser;
- extract one or more age restrictions for accessing the web application from the policy data; and
- perform a security action that prevents underage access to the web application based on the age restrictions.

17. The non-transitory computer-readable medium of claim 16, wherein the one or more computer-executable instructions cause the computing device to perform the security action by updating a parental control filter with the age restrictions to prevent access to one or more services provided by the web application.

* * * * *